Patented July 9, 1929.

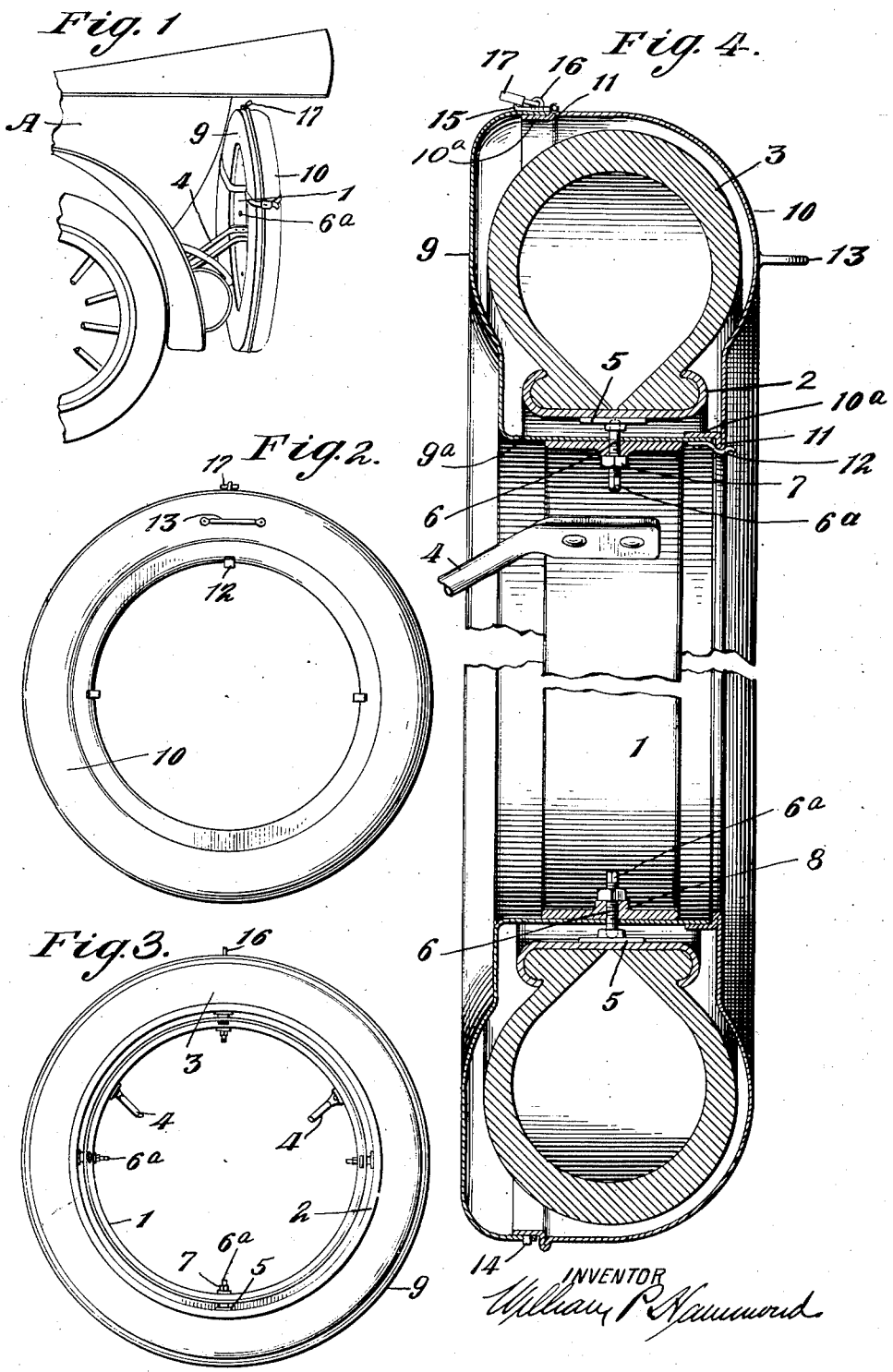

1,720,415

UNITED STATES PATENT OFFICE.

WILLIAM P. HAMMOND, OF EAST ORANGE, NEW JERSEY.

SPARE-TIRE CARRIER.

Continuation of application Serial No. 109,678, filed July 17, 1916. This application filed March 25, 1922. Serial No. 546,947.

The present application is a continuation of my application, Serial No. 109,678, filed July 17th, 1916.

The present invention relates more particularly to a metallic tire protecting casing for housing a spare tire of the demountable rim type and has for its object the provision of a metallic tire case, which is capable of supporting rigidly therein a demountable rimmed tire, so that such tire and attached rim when so supported will be entirely enveloped and protected from the heat of the sun and exhaust gases.

A further object is to so construct the metallic housing that it may be conveniently and expeditiously opened up so as to permit the demountable rimmed tire to be very easily and conveniently mounted or demounted from its support.

Further objects of the invention are to provide a spare tire carrier of this character which is comparatively simple and inexpensive in its construction, which can be mounted upon the vehicle in the usual manner without necessitating any special fixtures, which protects the tire and also prevents theft or unauthorized removal thereof, and which leaves the space within the tire unobstructed and available for use in mounting the necessary lamps, license tags, direction indicators, or the like upon the car.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which—

Figure 1 is a perspective view of the rear end of an automobile provided with a spare tire carrier constructed in accordance with the invention.

Figure 2 is a rear view of the spare tire carrier with the removable cover of the annular tire housing in operative position.

Figure 3 is a similar view with the said cover removed.

Figure 4 is an enlarged transverse vertical sectional view through the spare tire carrier, showing a spare tire in position therein.

Corresponding and like parts are referred to in the following description and indicated in all the views of the drawings by the same reference characters.

Referring to the drawings, which illustrate one possible embodiment of the invention, the reference numeral 1 designates a tire supporting bracket ring which is of a suitable size to fit loosely within the demountable rim 2 upon which the spare tire 3 is mounted. This tire supporting ring 1 may be held rigidly in position by means of bracket arms 4 which project from suitable parts of the vehicle body, and have their outer ends riveted or otherwise securely connected to the interior of the ring 1. In Figure 1 the tire supporting ring 1 is shown as held rigidly in a vertical position at the rear end of an automobile body A, only a fragmentary portion of which is shown.

The demountable rim 2 is engaged by a series of plates 5 which have a swivel connection with the outer ends of screws 6 threaded within suitable openings provided in the tire supporting ring 1 and spaced circumferentially thereof. The inner ends of the screws 6 have polygonal heads $6^a$, which are adapted to be engaged by a wrench or special tool for the purpose of turning the screws to force the plates 5 into engagement with the demountable rim 2, or move the plates away from the demountable rim to release the latter. Jam nuts 7 are threaded upon the screws 6 and are adapted to be turned into a tight engagement with bosses or enlargements 8 upon the ring 1 for the purpose of locking the adjusting screws 6 in position and preventing them from working loose. With this construction it will be obvious that within certain limits different sizes of demountable rims can be mounted upon the ring 1 and proper adjustment made for securely engaging and supporting the same.

Mounted upon the tire supporting bracket ring 1 is an annular sheet metal casing constructed to completely house the tire so as to prevent the same from being injured and protect it from the deteriorating action of the weather. This casing is formed in complemental sections 9 and 10, the rear section 9 being shown as permanently connected to the bracket ring 1, while the front section 10 is removable for the purpose of placing the spare tire in position or removing it therefrom. The rear section 9 may be formed with an inner annular wall 9ª, which has a substantially cylindrical formation and fits accurately upon the bracket ring 1.

The removable outer section 10 is constructed to extend over the tread portion of the spare tire 3, so that access can be readily had to the tire and a secure grip readily obtained thereon when the section 10 is removed. The edges of this section 10 are formed with annular flanges 10ª which telescopes within the corresponding edges of the rear section 9, and provide a tight rain and dustproof joint between the sections when the cover is in operative position. Outwardly projecting annular shoulders 11 at the bases of the flanges 10ª are arranged to engage the edges of the section 9 to limit the telescoping movement of the flanges 10ª within the section 9. The inner annular shoulder 11 may be engaged by a series of spring latches 12 when the cover 10 is in position, and a handle 13 may be applied to the cover for convenience in manipulating the same.

Means is also provided for securely locking the cover 10 in position upon the back 9, thereby eliminating the possibility of the spare tire being stolen or removed by an unauthorized person. At one side of the casing, in the present instance at the bottom thereof, the outer flange 10ª of the removable cover section 10 is provided with a pin 14 adapted to fit within a corresponding opening in the edge portion of the section 9. At the opposite side of the casing the section 10 is provided with a hasp 15 adapted to be swung over a staple member or keeper 16 upon the member 9, a padlock 17 being applied to the keeper 16 to lock the cover 10 in position. It will be obvious that the cover cannot be removed until after the padlock 17 has been disengaged from the keeper 16, and theft of the tire is thus impossible without breaking or multilating the carrier, which would invariably attract attention and be very risky.

The sheet metal casing avoids the necessity of placing a duck or fabric cover upon the spare tire, such covers being more or less objectionable, for the reason that they will not withstand the necessary washing and polishing, and are rather difficult to place upon a tire. After a very short period of use, a fabric cover will become worn and unsightly, while the sheet metal casing can be painted the color of the machine and given the same finish as the body of the machine. The washing and polishing of the machine will have no detrimental effect upon the sheet metal casing, and the adjusting screws 6 can be utilized to hold the rear section 9 of the sheet metal casing permanently in position upon the bracket ring 1.

While I have illustrated and described one possible embodiment of the principles of my invention, I wish it to be understood that this is illustrative rather than definitive and I desire to cover said principles in whatever form they may be embodied.

Having thus described my invention, I claim:

1. A rigid cylindrical casing adapted to receive and enclose a tire supported upon a demountable rim, one side of said casing being removable, means for securing said side in applied position and means engaging the demountable rim at a plurality of points for immovably holding the rim and tire supported thereon free from the inner surface of the casing.

2. A carrier for spare tires of the demountable rim type, including an annular rigid casing body of smaller inside diameter than the diameter of said tire rim; means to rigidly secure said casing body to an automobile, releasable means for holding said rim spaced all around from said casing, a detachable annular cover for said casing body, said body and cover forming jointly a tubular annular holder adapted to receive a tire and fastening means for detachably uniting said cover to said casing body, said tire being supported free from engagement with the inner surface of the casing.

3. A closed carrier for spare tires of the demountable character, comprising a supporting bracket, an annular casing body open at the front and rigidly secured to said supporting bracket, a cover for said casing body, the two forming jointly a tubular holder for the tire, and adjustable means associated with said bracket for engaging the rim of a demountable tire and holding it spaced from and immovable within the closed carrier, said rim and tire being secured out of engagement with the inner surface of the casing.

4. A spare tire carrier, including a tire supporting bracket member, and an annular sheet metal casing surrounding the bracket member and enclosing the tire, means carried by the bracket member adapted to engage the rim of a demountable tire and hold it rigid, said sheet metal casing being formed in complemental front and rear sections, and one of the sections having a cylindrical inner wall which engages the bracket member, the other section being removable and provided at its edges with flanges which have a telescoping engagement with the edges of the first mentioned section.

5. A spare tire carrier, including a tire supporting bracket member, an annular sheet metal casing surrounding the bracket member and enclosing the tire, means carried by the bracket member adapted to engage the rim of a demountable tire and hold it rigid, said sheet metal casing being formed in complemental front and rear sections, one of which is permanently secured to the bracket member, while the other section is removable and formed with edge flanges which have a telescoping engagement with the edges of the first mentioned section and latch members for holding the two sections together.

6. A spare tire carrier, including a tire supporting bracket member, an annular sheet metal casing surrounding the bracket member and enclosing the tire, means carried by the bracket member adapted to engage the rim of a demountable tire and hold it rigid, said sheet metal casing being formed in complemental front and rear sections, one of which is permanently secured to the bracket member, while the other section is removable, a hasp member upon one of the sections, and a keeper upon the other section for cooperation with the hasp member to admit of the two sections being locked together.

7. A cylindrical casing for a demountable spare tire, including a supporting bracket member, means cooperating with said bracket member adapted to engage the rim of a demountable rimmed tire to hold the same in rigidly supported position, an annular sheet metal casing associated with said bracket member adapted to house said tire, said sheet metal casing being formed with front and rear sections, the rear section being permanently secured to the bracket member and the front section being detachably secured thereto and shaped so as to extend rearwardly beyond the vertical axis of the supported tire to facilitate and make convenient the mounting or removal of the tire from the supporting member.

In testimony whereof I have affixed my signature to this specification.

WILLIAM P. HAMMOND.